(12) United States Patent
Kanemoto et al.

(10) Patent No.: US 8,877,372 B2
(45) Date of Patent: Nov. 4, 2014

(54) ALKALINE SECONDARY BATTERY

(75) Inventors: Manabu Kanemoto, Kyoto (JP); Tadashi Kakeya, Kyoto (JP); Mitsuhiro Kodama, Kyoto (JP)

(73) Assignee: GS Yuasa International Ltd., Kyoto (JP)

( * ) Notice: Subject to any disclaimer, the term of this patent is extended or adjusted under 35 U.S.C. 154(b) by 0 days.

(21) Appl. No.: 13/978,451

(22) PCT Filed: Jan. 11, 2012

(86) PCT No.: PCT/JP2012/050348
§ 371 (c)(1),
(2), (4) Date: Jul. 5, 2013

(87) PCT Pub. No.: WO2012/096291
PCT Pub. Date: Jul. 19, 2012

(65) Prior Publication Data
US 2013/0280602 A1  Oct. 24, 2013

(30) Foreign Application Priority Data

Jan. 11, 2011 (JP) ................. 2011-003426

(51) Int. Cl.
| | | |
|---|---|---|
| *H01M 6/04* | (2006.01) | |
| *H01M 10/30* | (2006.01) | |
| *H01M 4/62* | (2006.01) | |
| *H01M 4/36* | (2006.01) | |
| *H01M 4/52* | (2010.01) | |
| *H01M 10/24* | (2006.01) | |

(52) U.S. Cl.
CPC .............. *H01M 10/30* (2013.01); *H01M 4/624* (2013.01); *H01M 10/24* (2013.01); *H01M 4/366* (2013.01); *Y02E 60/12* (2013.01); *H01M 4/523* (2013.01)
USPC ....................................... 429/206

(58) Field of Classification Search
None
See application file for complete search history.

(56) References Cited

U.S. PATENT DOCUMENTS

| | | | |
|---|---|---|---|
| 5,804,334 A | 9/1998 | Yamamura et al. | |
| 5,993,995 A | 11/1999 | Bernard et al. | |
| 6,077,625 A | 6/2000 | Yano et al. | |

(Continued)

FOREIGN PATENT DOCUMENTS

| | | |
|---|---|---|
| JP | 9-199131 | 7/1997 |
| JP | 10-50308 | 2/1998 |

(Continued)

OTHER PUBLICATIONS

Wang et al., Surface behavior of pasted nickel electrodes with electrodeposited Co—Ce on substrate, Trans. Nonferrous Met. Soc. China 16(2006) 1148-1153).*

(Continued)

*Primary Examiner* — Patrick Ryan
*Assistant Examiner* — Jose Colucci Rios
(74) *Attorney, Agent, or Firm* — Rankin, Hill & Clark LLP

(57) ABSTRACT

An alkaline secondary battery includes a positive electrode having active material particles principally made of nickel hydroxide, a negative electrode, and an electrolyte solution. The positive active material particle has a core layer containing nickel hydroxide and a conductive auxiliary layer which coats the surface of the core layer. The conductive auxiliary layer contains a cobalt oxyhydroxide phase and a cerium dioxide phase. The electrolyte solution is principally made of an aqueous sodium hydroxide solution.

10 Claims, 4 Drawing Sheets

(56) References Cited

U.S. PATENT DOCUMENTS

| | | | |
|---|---|---|---|
| 6,287,726 B1 * | 9/2001 | Ohta et al. | 429/223 |
| 8,057,934 B2 | 11/2011 | Miiyamoto et al. | |
| 2004/0175615 A1 * | 9/2004 | Ovshinsky et al. | 429/223 |
| 2004/0197656 A1 | 10/2004 | Durkot et al. | |
| 2006/0029864 A1 | 2/2006 | Matsumoto et al. | |
| 2009/0239144 A1 * | 9/2009 | Izumi et al. | 429/206 |
| 2012/0115034 A1 | 5/2012 | Morishita et al. | |
| 2013/0136992 A1 | 5/2013 | Kanemoto et al. | |

FOREIGN PATENT DOCUMENTS

| | | |
|---|---|---|
| JP | 10-074536 | 3/1998 |
| JP | 10-261412 | 9/1998 |
| JP | 11-7949 | 1/1999 |
| JP | 11-7950 | 1/1999 |
| JP | 2006-59807 | 3/2006 |
| JP | 2007-149646 | 6/2007 |
| JP | 2010-129429 | 6/2010 |
| WO | 2006/064979 | 6/2006 |
| WO | 2011/007858 | 1/2011 |
| WO | 2012/018077 | 2/2012 |

OTHER PUBLICATIONS

Chang et al., Synthesis of g-CoOOH and its effects on the positive electrodes of nickel batteries, International Journal of Hydrogen Energy 34 (2009) 2435-2439.*

International Search Report dated May 1, 2012 filed in PCT/JP2012/050348.

Extended European Search Report dated May 8, 2014 filed in the corresponding European patent application No. 12734289.7.

* cited by examiner

Fig. 1

| | Conductive Auxiliary Layer | Composition of Electrolyte Solution (M represents mol/L) | Recovered Discharge Capacity (mAh) | Discharge Capacity Recovery Ratio (%) | Remaining Discharge Capacity (mAh) | Remaining Capacity Retention Ratio (%) |
|---|---|---|---|---|---|---|
| Example 1 | Co,Ce | 7M-NaOH | 1966 | 99.9 | 1782 | 90.5 |
| Example 2 | Co,Ce | 8M-NaOH | --- | --- | 1789 | 90.3 |
| Comparative Example 1 | Co,Ce | 7M-KOH | 1992 | 97.3 | 1736 | 86.7 |
| Comparative Example 2 | Co | 7M-NaOH | 1966 | 97.9 | 1717 | 87.3 |
| Comparative Example 3 | Co | 7M-KOH | 1990 | 96.5 | 1702 | 84.8 |

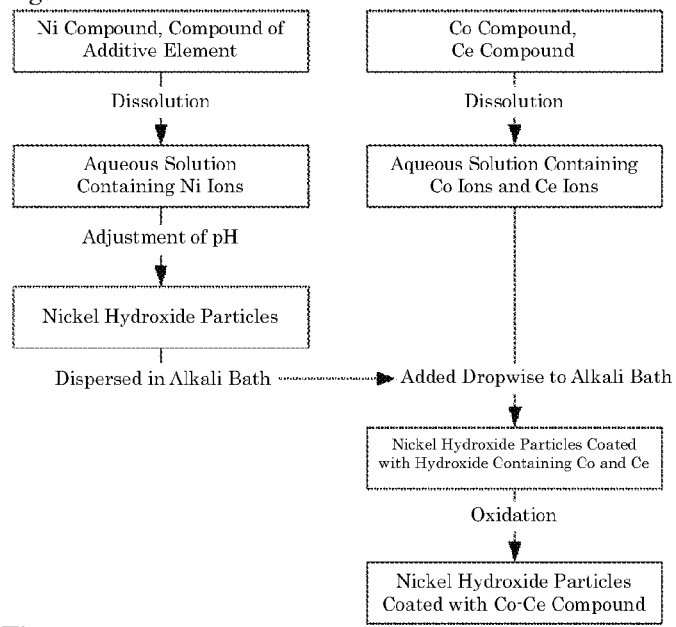

Fig. 2

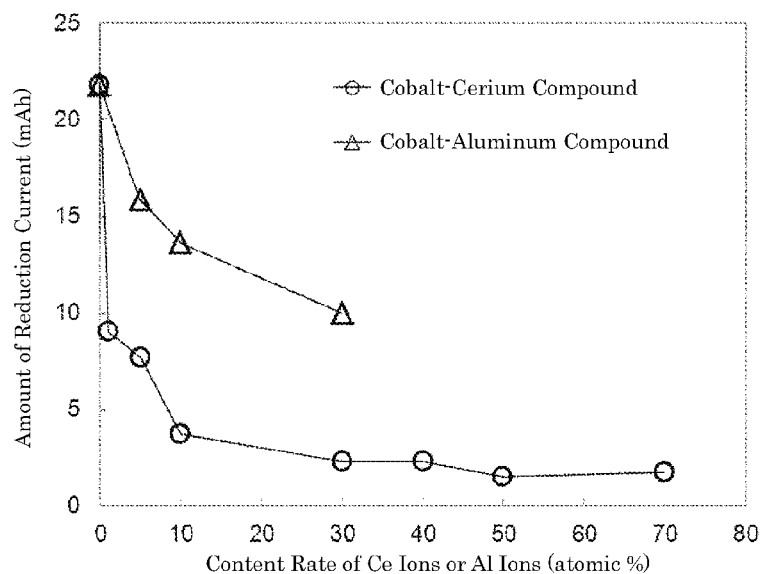

Fig. 3

ALKALINE SECONDARY BATTERY

TECHNICAL FIELD

The present invention relates to an alkaline secondary battery, and particularly to an alkaline secondary battery having an unsintered positive electrode.

BACKGROUND ART

As a battery having a high energy density and excellent reliability, a nickel-metal hydride rechargeable battery, particularly, one which is provided with an unsintered positive electrode, in which an active material containing nickel hydroxide is filled into a foamed nickel porous body substrate or the like, is used in various uses. Further, in the unsintered positive electrode, since the electric conductivity of nickel hydroxide, which is an active material in a discharged state, is low, cobalt oxyhydroxide (CoOOH) having high electric conductivity is used as an electroconductive additive to increase the active material utilization. In this case, nickel hydroxide particles and cobalt compound particles are mixed for use, or the surface of the nickel hydroxide particle is coated with cobalt oxyhydroxide.

The nickel-metal hydride battery has a problem that the remaining capacity is easily reduced by self discharge. That is, a self-decomposition reaction of the nickel electrode is represented by the following chemical reaction formula:

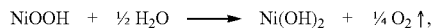

thereby, the nickel electrode is reduced to nickel hydroxide involving oxygen-generation to cause self discharge.

Hence, various methods are proposed for inhibiting an oxygen-generation reaction to suppress self discharge by increasing an oxygen generation overvoltage.

In Patent Document 1, it is described that the oxygen generation overvoltage increases by containing a compound such as calcium with respect to a nickel electrode for an alkaline secondary battery, which has nickel hydroxide and a divalent or higher cobalt compound which coats the surface of nickel hydroxide, and contains a compound such as calcium in a coating layer thereof.

Further, an aqueous solution of potassium hydroxide which is superior in electric conductivity is often used for an electrolyte solution, but it is known that the oxygen generation overvoltage increases by replacing potassium with sodium having a smaller ion radius.

On the other hand, when the battery is overdischarged, a problem arises that the battery capacity is not completely recovered even if the battery is charged again. Cobalt oxyhydroxide is stable under a normal positive electrode condition and insoluble in an alkaline electrolyte solution. However, when a positive potential approaches a negative potential by overdischarge of a battery or a battery is in a state of reverse charge, cobalt oxyhydroxide is reduced, resulting in a decrease in an oxidation number of cobalt (Co) and a reduction in electric conductivity. If cobalt oxyhydroxide is further reduced to be changed to cobalt hydroxide, it is eluted into an electrolyte solution, and does not serve as an electroconductive additive.

For this situation, an attempt to inhibit the reduction of cobalt oxyhydroxide is made. In Patent Document 2 is proposed a constitution in which antimony or the like is added to an oxidized compound of cobalt. However, although a lot of substances to be added to an oxidized compound of cobalt are described in Patent Document 2, only a few substances of these substances, such as magnesium and aluminum, are actually measured and evaluated for the battery capacity as experimental data, and there is no description which allows to guess what characteristics other substances exhibit.

PRIOR ART DOCUMENTS

Patent Documents

Patent Document 1: JP-A-10-261412
Patent Document 2: JP-A-10-50308

SUMMARY OF THE INVENTION

Problems to be Solved by the Invention

The present invention was made in view of such issues, and it is an object of the present invention to provide an alkaline secondary battery exhibiting superior storage characteristics in a charged state, and exhibiting superior battery capacity recovery characteristics even in an overdischarged state.

Means for Solving the Problems

The present invention provides an alkaline secondary battery including a positive electrode having active material particles principally made of nickel hydroxide, a negative electrode, and an electrolyte solution, wherein the positive active material particle has a core layer containing nickel hydroxide and a conductive auxiliary layer which coats the surface of the core layer, the conductive auxiliary layer contains a cobalt oxyhydroxide phase and a cerium dioxide phase, and the electrolyte solution is principally made of an aqueous sodium hydroxide solution.

Since the conductive auxiliary layer contains a cerium dioxide phase and the electrolyte solution is principally made of an aqueous sodium hydroxide solution, reduction of cobalt oxyhydroxide is inhibited even in an overdischarged state, and therefore a capacity recovery ratio at the time when the battery is recharged after overdischarge can be increased.

Further, since the conductive auxiliary layer contains a cerium dioxide phase and the electrolyte solution is principally made of an aqueous sodium hydroxide solution, reduction of the remaining capacity can be inhibited to enhance the capacity retention ratio even when a battery is stored in a charged state.

Advantages of the Invention

In accordance with the present invention, it is possible to attain an alkaline secondary battery exhibiting superior storage characteristics in a charged state, and exhibiting superior battery capacity recovery characteristics even in an overdischarged state.

BRIEF DESCRIPTION OF THE DRAWINGS

FIG. 1: A list of examples and comparative examples.
FIG. 2: A flow chart showing a process of preparing a positive active material according to an embodiment of the present invention.
FIG. 3: A graph showing a relation between the amount of reduction current of a cobalt-cerium compound and the content rate of cerium ions.

MODE FOR CARRYING OUT THE INVENTION

Figure 4:
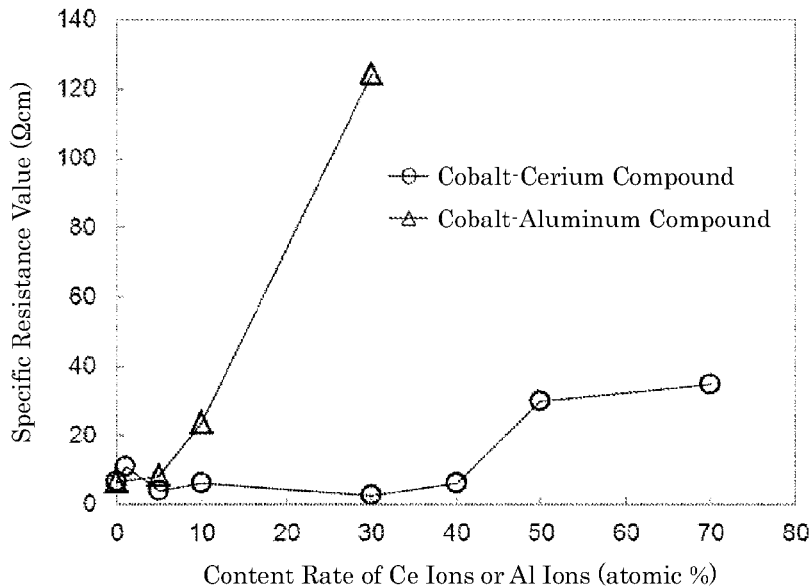
FIG. 4: A graph showing a relation between the specific resistance value of a cobalt-cerium compound and the content rate of cerium ions.

First, a structure of a positive active material particle to be used for the alkaline secondary battery which is an embodiment of the present invention will be described.

The active material particle is a composite particle comprising a core layer containing nickel hydroxide and a conductive auxiliary layer which coats the surface of the core layer.

Nickel hydroxide is an active material which is oxidized or reduced associated with charge-discharge of the alkaline secondary battery and is a main component of the active material particle.

The core layer may contain other components for reforming nickel hydroxide. For example, the core layer may contain Zn in order to prevent swelling of an electrode. In addition, the core layer preferably contains Co in order to improve charge efficiency at elevated temperatures. However, when the concentrations of Zn and Co are too high, the amount of the active material to be filled is decreased and the battery capacity is reduced. Therefore, the concentration of the total of Zn and Co is preferably 5% by mass or less.

The conductive auxiliary layer contains a cobalt oxyhydroxide phase and a cerium dioxide phase. The conductive auxiliary layer may contain a small amount of a tricobalt tetroxide phase, as described later. Further, the abundance of the cerium dioxide phase to the total of the cobalt oxyhydroxide phase and the cerium dioxide phase in the conductive auxiliary layer is preferably 6.5% by mass or more and 88.2% by mass or less, and more preferably 13.4% by mass or more and 48.6% by mass or less.

The reason for this is that it is possible to obtain, when the conductive auxiliary layer contains the cerium dioxide phase, the effect of inhibiting the reduction of cobalt oxyhydroxide in the case where the battery is overdischarged or reversely charged. Another reason for this is that the resistance value of the conductive auxiliary layer can be lowered by setting the abundance of the cerium dioxide phase to the above-mentioned preferable range. The detail will be described later based on examples.

Since most of cobalt contained in the conductive auxiliary layer exists as cobalt oxyhydroxide from the beginning, it is possible to maintain a state in which the cobalt oxyhydroxide phase exists in micro form together with the cerium dioxide phase as they were produced even when the battery is used.

Hitherto, cobalt hydroxide or the like is sometimes used as a compound of cobalt, and in this case, cobalt hydroxide or the like is dissolved in an electrolyte solution, and oxidized in initial charge and precipitated again as cobalt oxyhydroxide having high electric conductivity, and thereby cobalt can exert a function as an electroconductive additive. Therefore, even if the cerium dioxide phase exists in the cobalt hydroxide phase, separation of the cobalt oxyhydroxide phase from the cerium dioxide phase proceeds in the process of dissolution/reprecipitation of the cobalt compound. On the other hand, in the present invention, when cobalt oxyhydroxide is used, since cobalt oxyhydroxide does not undergo the process of dissolution/reprecipitation and the cobalt oxyhydroxide phase exists in micro form together with the cerium dioxide phase, the effect of the cerium dioxide phase on inhibiting the reduction of cobalt oxyhydroxide is adequately exerted.

The oxidation number of cobalt is preferably 3.28-valent or more. When the oxidation number of cobalt is 3.28-valent or more, it is possible to achieve the effect of inhibiting the reduction and the effect of lowering the resistance value of the conductive auxiliary layer simultaneously. The oxidation number of cobalt is determined by radiation XANES measurement. Further, measured values of a zero-valent Co foil, divalent $Co(OH)_2$ and 2.666-valent $Co_3O_4$ were used for preparation of a calibration curve to determine the oxidation number.

The amount of use of the cobalt-cerium compound (the amount of the cobalt-cerium compound which coats the surface of the nickel hydroxide particles), the conductive auxiliary layer, is preferably 0.1% by mass or more and 10% by mass or less with respect to the total of the cobalt-cerium compound and nickel hydroxide. By precipitating the conductive auxiliary layer on the surface of the nickel hydroxide particles, a conductive network is formed, and therefore an electrode for an alkaline secondary battery having low internal resistance can be obtained. However, when the amount of use of the cobalt-cerium compound is less than 0.1% by mass, an electrode for an alkaline secondary battery having adequately low internal resistance cannot be obtained. Also when the amount of use is more than 10% by mass, the amount of a nickel active material in the electrode is relatively decreased to deteriorate volume efficiency of the battery. This preferable range of the amount of use is applied without problem when the content rate of the total of the cobalt oxyhydroxide phase and the cerium dioxide phase, respectively contained in the cobalt-cerium compound, is 94% by mass or more, but when the content rate of both the phases is small, it is preferred to change the range of the amount of use to a range including a larger amount so that the total amount of the cobalt oxyhydroxide phase and the cerium dioxide phase becomes similar to the above-mentioned content rate.

Next, the constitution of the alkaline secondary battery according to an embodiment of the present invention may be the same as that of a publicly known alkaline secondary battery except that the alkaline secondary battery has the above-mentioned positive active material particles and the electrolyte solution is principally made of an aqueous sodium hydroxide solution.

The electrolyte solution is principally made of an aqueous sodium hydroxide solution, and potassium hydroxide or the like may be mixed in the aqueous solution for use. Here, that the electrolyte solution is principally made of an aqueous sodium hydroxide solution means that the ratio of NaOH in the whole electrolyte is larger than 50 mol %. In the electrolyte solution, the proportion of NaOH in the whole electrolyte is preferably seven-eighth or more. Further, the electrolyte solution more preferably contains only NaOH as an electrolyte excluding impurities inadvertently contained.

The present inventors made detailed investigations in order to check the effect of inhibiting the reduction of cobalt oxyhydroxide caused by the cerium dioxide phase contained in the conductive auxiliary layer, and to determine an appropriate content of cerium. Specifically, particles of a compound having a crystal structure containing a cobalt oxyhydroxide phase and a cerium dioxide phase (hereinafter, also referred to as cobalt-cerium compound particles) were prepared, and the crystal structure, specific resistance value and reduction resistance of the particles were evaluated. The content of the evaluation will be described in detail below.

Cobalt-cerium compound particles serving as a sample are prepared by dissolving a cobalt compound and a cerium compound to obtain an aqueous solution containing Co ions and Ce ions (hereinafter, sometimes abbreviated as an "aqueous Co—Ce solution"), adding the obtained aqueous Co—Ce solution dropwise to a solution with the pH adjusted to a constant value to precipitate a hydroxide containing cobalt and cerium in the aqueous solution, and subjecting the hydroxide to an oxidation treatment. The concentration of a compound in the prepared particles can be adjusted by changing the ratio between the cobalt compound and the cerium compound to be respectively dissolved.

Cobalt sulfate and cerium nitrate were dissolved in a predetermined ratio in such a way that the total of Co atoms and Ce atoms was 1.6 mol/L (liter) to prepare an aqueous Co—Ce solution. The ratio between cobalt sulfate and cerium nitrate was varied in the range of 100:0 to 30:70 in terms of an atomic ratio between Co and Ce (Co:Ce).

An aqueous NaOH solution was controlled so as to keep a pH of 9 and a temperature of 45° C., and the above-mentioned aqueous Co—Ce solution was added dropwise to the aqueous NaOH solution while vigorously stirring the resulting mixture to precipitate a hydroxide containing cobalt and cerium. The pH of the aqueous NaOH solution serving as a bath for dropwise addition was adjusted by appropriately adding a 18% by mass aqueous NaOH solution. The precipitate was collected by filtration, washed with water, and dried to obtain hydroxide particles containing cobalt and cerium.

40 g of a 48% by mass aqueous NaOH solution was added to 50 g of the hydroxide particles containing cobalt and cerium, and the resulting mixture was heated at 120° C. for 1 hour in the air, filtrated, washed with water, and dried to obtain desired cobalt-cerium compound particles.

By analyzing, by a Rietveld method, measurement results of the obtained cobalt-cerium compound particles by an X-ray diffractometer, the crystal structure was identified, and the abundance of a phase having the identified crystal structure was identified. As the X-ray diffractometer, product number M06XCE manufactured by Bruker AXS was used, and measurement conditions were set to 40 kV and 100 mA (Cu tube). Analysis by the Rietveld method was performed by use of RIETAN 2000 (F. Izumi, T. Ikeda, Mater. Sci. Forum, 321-324 (2000), p. 198) as analysis software.

The specific resistance value is a value obtained by measurement of powder resistance. The measurement of powder resistance was performed by putting 50 mg of a sample powder in a circular mold of 4 mm in radius, and pressurizing the powder to 10 MPa. The specific resistance value (an inverse of electric conductivity) of the sample powder can be determined from the measurement result.

Figure 7:
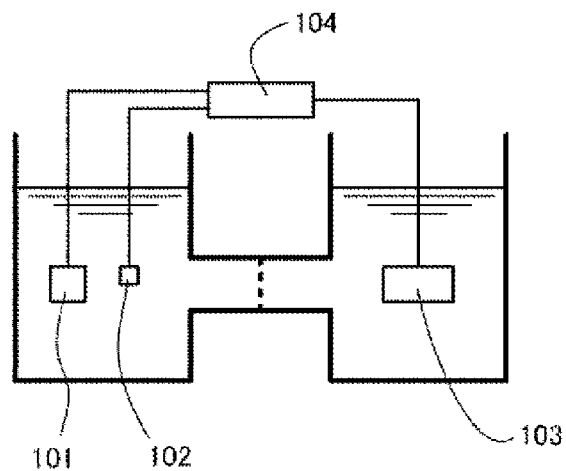
FIG. 7: A drawing showing a constitution of an evaluation device of a cobalt-cerium compound.

Ease of being reduced of the sample was evaluated by measuring the reduction current by use of an apparatus shown in FIG. 7.

A working electrode 101 formed by filling cobalt-cerium compound particles serving as a sample into a nickel foam, a reference electrode (Hg/HgO) 102 and a counter electrode 103 which is a hydrogen storing alloy electrode like a negative electrode of a common nickel-metal hydride battery are arranged in an electrolyte solution (6.8 mol/L aqueous KOH solution), and a current flowed is measured with the potential of the working electrode 101 set with reference to the reference electrode 102 by a control device 104. When the potential of the working electrode 101 is set to 1 V (almost the same potential as in the counter electrode 103) at which the cobalt-cerium compound particles tend to cause a reduction reaction, the flowed current is generated due to the reduction reaction, and by determining the integral of the current flowed by the reduction reaction, the likelihood of the reduction reaction can be quantitatively evaluated.

The working electrode 101 filled with the cobalt-cerium compound particles was prepared by the following method. Particles of a synthesized cobalt-cerium compound was added to a 1% by mass aqueous solution of carboxylmethylcellulose (CMC) and kneaded, and in this, a 40% by mass water dispersion of polytetrafluoroethylene (PTFE) was mixed. The ratio between the cobalt-cerium compound particles and PTFE (solid content) in the resulting mixture was set to 97:3. The resulting mixture was filled into a nickel foam substrate having a thickness of 1.4 mm and an area density of 450 g/m$^2$, and dried, and then the resulting substrate was rolled to form an original sheet. The original sheet was cut into a size of 2 cm in length and 2 cm in width, and a tab for current collecting was attached to the original sheet to obtain a working electrode 101. The amount of the cobalt-cerium compound particles calculated from the filling amount into the electrode plate was 0.2 g.

A crystal structure contained in the cobalt-cerium compound was analyzed, and consequently it was found that the cobalt-cerium compound particles are made principally of a cobalt oxyhydroxide phase having a crystal structure which is a rhombohedral structure and a space group R3m structure (hereinafter, simply referred to as a "cobalt oxyhydroxide phase") and a cerium dioxide phase having a crystal structure which is a fluorite structure and a space group Fm3m structure (hereinafter, simply referred to as a "cerium dioxide phase"), and include a slight amount of a tricobalt tetroxide crystal phase depending on the preparation condition of the cobalt-cerium compound.

The result obtained by Rietveld analysis of crystal structures of the cobalt oxyhydroxide phase and the cerium dioxide phase which are important among these crystal phases will be described in more detail.

Figure 8:
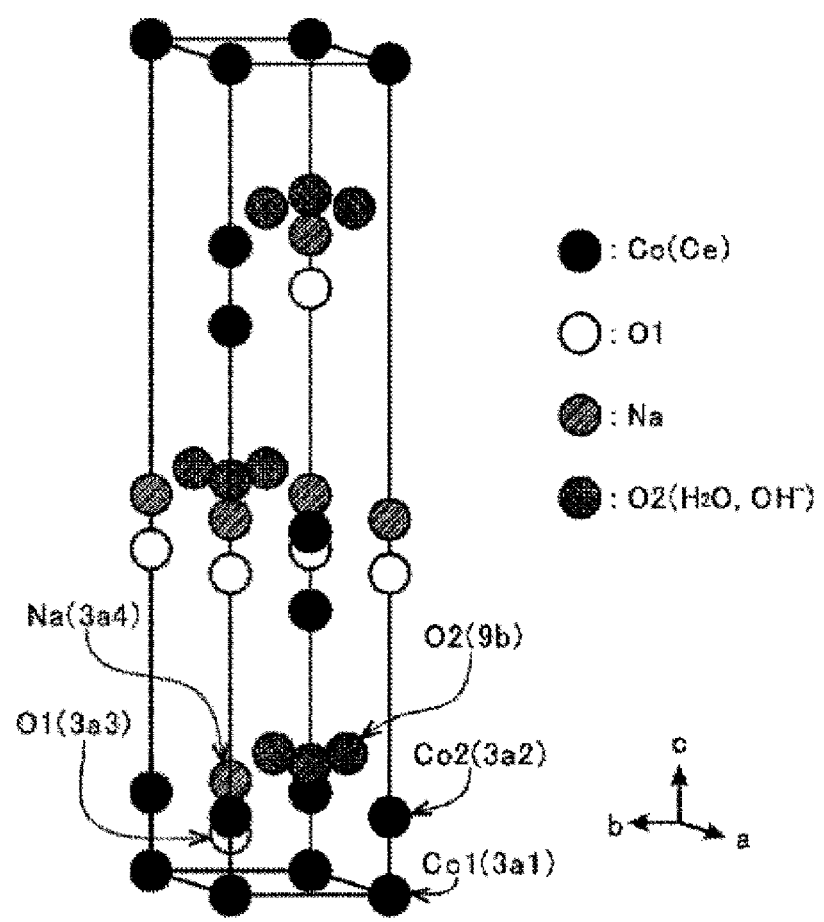
FIG. 8: A drawing showing a crystal structure model of a cobalt oxyhydroxide phase composing a part of a cobalt-cerium compound.

The cobalt oxyhydroxide phase has a crystal structure which is a rhombohedral structure and a space group R3m structure as in the crystal structure model shown in FIG. 8, and contains at least cobalt atoms, oxygen atoms and hydrogen atoms as constituent elements. Further, in the cobalt-cerium compound of the present invention, the cobalt oxyhydroxide phase can contain cerium atoms. These atoms are positioned at predetermined sites shown in FIG. 8. Specifically, Co or Ce is positioned at 3a1 and 3a2 sites, and an oxygen atom (including an oxygen atom composing a water molecule or a hydroxy-ion) is positioned at 3a3 and 9b sites. When cerium is contained, cerium is positioned at 3a1 and 3a2 sites. In addition, no atom is required to be positioned at the 3a4 site, but it is preferred to position Na at 3a4 site as shown in FIG. 8. Positioning of Na at 3a4 site can be performed by making sodium hydroxide and hydroxide containing cobalt and cerium coexist when a hydroxide containing cobalt and cerium is subjected to a heat treatment. By containing Na, it is possible to allow oxidation to proceed easily in the oxidation treatment in a manufacturing process.

Figure 9:
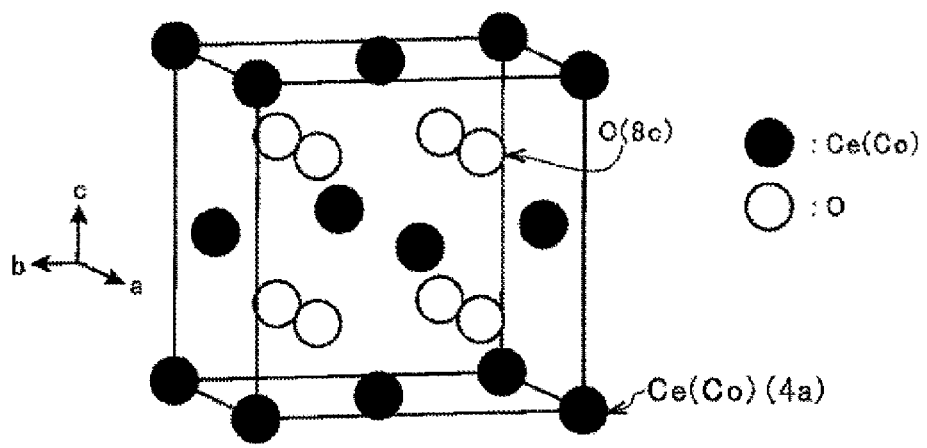
FIG. 9: A drawing showing a crystal structure model of a cerium dioxide phase composing a part of a cobalt-cerium compound.

The cerium dioxide phase has a crystal structure which is a fluorite structure and a space group Fm3m structure as in the crystal structure model shown in FIG. 9, and contains at least cerium atoms and oxygen atoms as constituent elements.

Further, in the cobalt-cerium compound of the present sample, the cerium dioxide phase can contain cobalt atoms. These atoms are positioned at predetermined sites shown in FIG. 9. Specifically, Co or Ce is positioned at 4a site, and an oxygen atom is positioned at 8c site. When cobalt is contained in the cerium dioxide phase, cobalt is substituted for a part of cerium.

Measurement results of the specific resistance and the reduction current, and the content rate of each crystal phase of the obtained cobalt-cerium compound particles are shown in Table 1.

The "content rate of cerium" in Table 1 is the content rate of Ce ions to the total of Co ions and Ce ions in the aqueous solution containing cobalt ions and cerium ions in a production process of a cobalt-cerium compound, which is expressed in atomic %. The specific resistance value is a value obtained by the above-mentioned measurement of powder resistance. The amount of reduction current is measured by the above-mentioned method, and the amount of current integrated over 1 hour. The content rate of a crystal phase is a value determined by Rietveld analysis, and the content rates of the cobalt oxyhydroxide phase, the cerium dioxide phase and the tricobalt tetroxide phase in the cobalt-cerium compound are expressed in % by mass. Further, the abundance of the cerium dioxide phase is the abundance of the cerium dioxide phase to the total of the cobalt oxyhydroxide phase and the cerium dioxide phase in the cobalt-cerium compound, which is calculated from the content rate of each phase.

Table 1). Data of a compound containing aluminum are also shown in FIG. 4, and this will also be described later.

Data of FIG. 4 show that the specific resistance values at the time when the content rate of cerium is 1 to 40 atomic % are maintained at low values which are rarely different from the specific resistance value at the time of not containing cerium at all. When the content rate of cerium is 50 atomic % or more, the specific resistance value is small enough for practical use even though it is increased.

Figure 5:
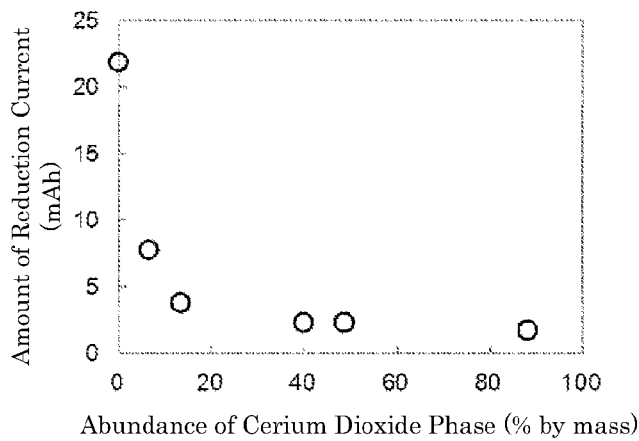
FIG. 5: A graph showing a relation between the amount of reduction current of a cobalt-cerium compound and the abundance of a cerium dioxide phase.

Next, FIG. 5 is a graph drawn by plotting data in Table 1 indicating a relation between the amount of reduction current and the abundance of the cerium dioxide phase (the column on the rightmost side in Table 1).

Data of FIG. 5 also show that the amount of reduction current is sharply reduced by virtue of the existence of the cerium dioxide phase, corresponding to data of FIG. 3. That is, it is found that a reduction reaction becomes hard to occur by virtue of the existence of the cerium dioxide phase. The amount of reduction current is sharply reduced even when the abundance of the cerium dioxide phase is 6.5% by mass. The amount of reduction current is further reduced in a region where the abundance of the cerium dioxide phase is 13.4% by mass or more, and furthermore reduced in a region of 40.0% by mass or more, and maintained at low values up to the data limitation of 88.2% by mass.

Figure 6:
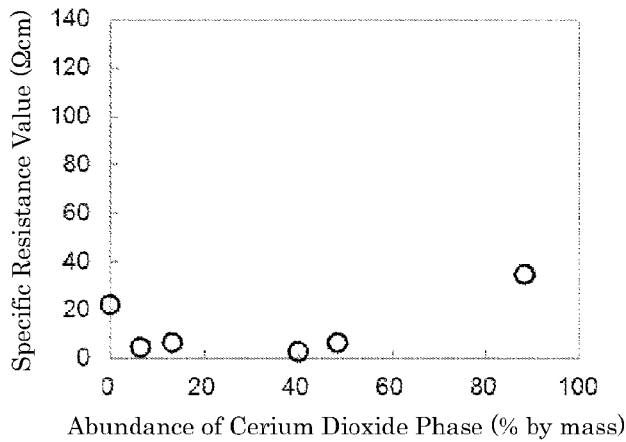
FIG. 6: A graph showing a relation between the specific resistance value of a cobalt-cerium compound and the abundance of a cerium dioxide phase.

Moreover, FIG. 6 is a graph drawn by plotting data in Table 1 indicating a relation between the specific resistance value

TABLE 1

| Content Rate of Cerium (atomic %) | Specific Resistance Value (Ωcm) | Amount of Reduction Current (mAh) | Content Rate of Crystal Phase (% by mass) | | | Abundance of Cerium Dioxide Phase (% by mass) |
|---|---|---|---|---|---|---|
| | | | Cobalt Oxyhydroxide Phase | Cerium Dioxide Phase | Tricobalt Tetroxide Phase | |
| 0 | 6.6 | 21.8 | 100.00 | 0.00 | 0.00 | 0.0 |
| 1 | 11.1 | 9.0 | — | — | — | — |
| 5 | 4.2 | 7.7 | 91.27 | 6.36 | 2.37 | 6.5 |
| 10 | 6.4 | 3.7 | 84.96 | 13.19 | 1.84 | 13.4 |
| 30 | 2.8 | 2.3 | 56.60 | 37.74 | 5.66 | 40.0 |
| 40 | 6.2 | 2.3 | 51.42 | 48.59 | 0.00 | 48.6 |
| 50 | 29.9 | 1.5 | — | — | — | — |
| 70 | 34.5 | 1.7 | 11.76 | 88.24 | 0.00 | 88.2 |

FIG. 3 is a graph drawn by plotting data in Table 1 indicating a relation between the amount of reduction current and the content rate of cerium (the column on the leftmost side in Table 1). Data of a compound containing aluminum are shown in FIG. 3, and this will be described later.

Data of FIG. 3 show that the amount of reduction current is sharply reduced even when the content rate of cerium is 1 atomic %. That is, the data show that a reduction reaction rapidly becomes hard to occur when the content rate of cerium is 1 atomic % or more. The amount of reduction current is further decreased in a region where the content rate of cerium is 10 atomic % or more, and furthermore decreased in a region of 30 atomic % or more, and maintained at low values up to the data limitation of 70 atomic %.

FIG. 4 is a graph drawn by plotting data in Table 1 indicating a relation between the specific resistance value and the content rate of cerium (the column on the leftmost side in and the abundance of the cerium dioxide phase (the column on the rightmost side in Table 1).

Data of FIG. 6 also show that the specific resistance values at the time when the abundance of cerium dioxide is 48.6% by mass, which corresponds to the content rate of cerium of 40 atomic %, or less are maintained at low values which are rarely different from the specific resistance value at the time of not containing cerium at all. When the abundance of cerium dioxide is 88.2% by mass which corresponds to the content rate of cerium ions of 50 atomic %, the specific resistance value is small enough for practical use even though it is increased.

Next, for comparison with the above-mentioned experimental data, the results of experiments on cobalt compounds including an added substance other than cerium will be described. As the substance to be added to the cobalt compound, aluminum (Al), manganese (Mn), magnesium (Mg), yttrium (Y), and iron (Fe) were used. Each of these substances was subjected to the same treatment as in the case of cerium to prepare a compound with cobalt, and the specific resistance and the reduction current were measured as in the case of cerium. The results of measurement are shown in Table 2.

TABLE 2

| Added Element | Content Rate of Added Element (atomic %) | Specific Resistance Value (Ωcm) | Amount of Reduction Current (mAh) |
|---|---|---|---|
| None | 0 | 6.6 | 21.8 |
| Al | 5 | 8.6 | 15.8 |
| Al | 10 | 23.6 | 13.6 |
| Al | 30 | 124.4 | 10.0 |
| Mn | 30 | 11.2 | 41.5 |
| Mg | 30 | 260.3 | 6.8 |
| Y | 30 | 444.4 | — |
| Fe | 30 | — | 14.5 |

The "content rate of added element" in Table 2 is, as with the "content rate of cerium" in Table 1, the content rate of each element ions to the total of cobalt ions and each element ions in the aqueous solution containing cobalt ions and each element ions in a production process, which is expressed in atomic %. The specific resistance value and the amount of reduction current are similar to those in Table 1.

As shown in Table 2, the content rate of aluminum as an added element was varied in three stages, and the content rate of other elements as added elements was fixed at 30 atomic % to determine approximate characteristics.

Data of the cobalt compound including added aluminum in Table 2, that is, a cobalt-aluminum compound, are shown in FIG. 3 and FIG. 4 together with those of a cobalt-cerium compound.

Comparing the cobalt-cerium compound with the cobalt-aluminum compound, while the amount of reduction current of the cobalt-aluminum compound is considerably higher than that of the cobalt-cerium compound, it exhibits a certain decreasing tendency against an increase in aluminum. Accordingly, the amount of reduction current is expected to be further reduced by further increasing the content rate of aluminum.

However, comparing the cobalt-cerium compound with the cobalt-aluminum compound on the graph of specific resistance value of FIG. 4, the specific resistance value is rapidly increased as the content rate of aluminum is increased. This means impairment of a function as the electroconductive additive, which is an inherent object.

Moreover, as regards other elements in Table 2, in manganese, the specific resistance value is small, but the amount of reduction current is large, and therefore the reduction resistance is shown to be low, in magnesium and yttrium, the specific resistance value is very large, and in iron, the amount of reduction current is large.

Comparing the cobalt-cerium compound with the cobalt compounds including such various elements added, it can be said that the cobalt-cerium compound is peculiar in point of exhibiting extremely excellent values in both of the amount of reduction current and the specific resistance value.

It was found from the result of investigations described above that as a substance to be used as a conduction aid of a positive electrode for an alkaline secondary battery required to have both of reduction resistance and low resistance value, a cobalt-cerium compound containing the cobalt oxyhydroxide phase and the cerium dioxide phase, in which the abundance of the cerium dioxide phase to the total of the cobalt oxyhydroxide phase and the cerium dioxide phase is 6.5% by mass or more and 88.2% by mass or less, responds properly to such requirements. Further, it was found that the abundance of the cerium dioxide phase is more preferably 13.4% by mass or more and 48.6% by mass or less.

Further, it was found that, in order to realize the above-mentioned preferred abundance of cerium dioxide, the content rate (Ce/(Co+Ce) in atomic %) of cerium in the aqueous solution containing cobalt ions and cerium ions should be 5 atomic % or more and 70 atomic % or less, and more preferably 10 atomic % or more and 40 atomic % or less.

Then, in the cobalt-cerium compound, the cobalt oxyhydroxide phase and the cerium dioxide phase preferably predominantly exist, and specifically, the total of these two phases is preferably 50% by mass or more, more preferably 75% by mass or more, and further preferably 94% by mass or more.

Next, a method for manufacturing a nickel-metal hydride battery which is an embodiment of the present invention will be described.

First, the active material particles, as shown in FIG. 2, can be prepared by preparing nickel hydroxide particles, precipitating a hydroxide layer containing cobalt and cerium on the surface of the particles, and subjecting the hydroxide coating layer containing cobalt and cerium to an oxidation treatment.

The particles containing nickel hydroxide serving as a core layer can be prepared by changing the pH of the aqueous solution obtained by dissolving a nickel compound (hereinafter, sometimes abbreviated as an "aqueous Ni solution"). Specifically, the particles of $Ni(OH)_2$ can be precipitated by preparing an aqueous solution of a salt of a strong acid such as nickel sulfate, and shifting the pH of the aqueous solution to alkaline side. The precipitate is collected by filtration, washed with water, and dried to obtain spherical nickel hydroxide particles.

As the nickel compound, various types of water-soluble compounds such as nickel sulfate can be used. Further, an ammine complex of nickel may be produced by adding an ammonium compound to the aqueous solution.

As regards a method of changing the pH, it is possible to add the above-mentioned aqueous Ni solution dropwise to a bath for precipitation controlled so as to keep a constant pH or to add an alkaline aqueous solution to an aqueous Ni solution.

As regards a specific example of a method of adding the aqueous Ni solution dropwise, an aqueous solution obtained by dissolving nickel sulfate is added dropwise to a 1 mol/L aqueous ammonium sulfate solution which is controlled so as to keep a pH of 12 and a temperature of 45° C. while vigorously stirring, and thereby particles of nickel hydroxide can be precipitated. The pH can be adjusted by appropriately adding, for example, a 18% by mass aqueous NaOH solution.

As regards a specific example of a method of adding an alkaline aqueous solution to the aqueous Ni solution, ammonium sulfate and an aqueous NaOH solution are added to the aqueous Ni solution to produce an amine complex, and further an aqueous NaOH solution is added dropwise to the reaction system while vigorously stirring, and the reaction bath is controlled so as to maintain a temperature of 45° C.±2° C. and a pH within a range of 12±0.2, and thereby particles of nickel hydroxide can be precipitated.

When an element other than nickel is added, a compound of the element to be added can be dissolved in the aqueous solution together with the nickel compound. For example, when various water-soluble compounds of Zn or Co are dissolved in the aqueous solution together with the Ni compound and the pH of the aqueous solution is changed, spherical particles of nickel hydroxide in which Zn or Co is substituted for a part of Ni therein (hereinafter, simply referred to as "nickel hydroxide") are obtained.

For the purpose of precipitating a hydroxide layer containing cobalt and cerium on the surface of the core layer particles containing nickel hydroxide, it is possible to employ a method of adding an aqueous solution containing cobalt ions and cerium ions (hereinafter, sometimes abbreviated as an "aqueous Co—Ce solution") dropwise to an aqueous solution in which nickel hydroxide particles are dispersed and whose pH has been adjusted.

The aqueous Co—Ce solution is prepared by dissolving a cobalt compound and a cerium compound in water. As the cobalt compound and the cerium compound, various types of water-soluble compounds such as cobalt sulfate and cerium nitrate can be used. In this case, concentrations of cobalt and cerium in a precipitate can be adjusted by changing the ratio between the cobalt compound and the cerium compound to be respectively dissolved.

A specific example is as follows. Nickel hydroxide particles are mixed and dispersed in a 0.1 mol/L aqueous ammonium sulfate solution, and the resulting mixture is controlled so as to keep a pH of 9 and a temperature of 45° C. and vigorously stirred. The pH can be adjusted by using, for example, a 18% by mass aqueous NaOH solution. To the solution, an aqueous solution obtained by dissolving cobalt sulfate and cerium nitrate in a predetermined proportion is added dropwise. Thereby, a hydroxide containing cobalt and cerium is precipitated on the surface of the nickel hydroxide particles. The solid matter is collected by filtration, washed with water, and dried to obtain nickel hydroxide particles coated with a hydroxide containing cobalt and cerium.

Composite particles in which the surface of the core layer particles containing nickel hydroxide is coated with a cobalt-cerium compound can be obtained by subjecting a composite particles, in which the surface of nickel hydroxide is coated with a hydroxide layer containing cobalt and cerium, to an oxidation treatment.

In the oxidation treatment, it is preferred to heat the composite particles in the coexistence of the alkaline aqueous solution principally made of sodium hydroxide and oxygen. The reason for this is that sodium has an action of accelerating the oxidation of cobalt in the hydroxide.

The amount of sodium hydroxide to be used is preferably selected in such a way that the ratio (Na/(Co+Ce+Ni)) is 0.5 or more in terms of molar ratio.

The heating temperature can be set to 60° C. or more and the boiling point of the aqueous sodium hydroxide solution or less, and preferably 100° C. or more and the boiling point of the aqueous sodium hydroxide solution or less.

A more specific example is as follows. 40 g of an aqueous NaOH solution having a concentration of 48% by mass can be added to 50 g of particles in which the surface of the core layer particles containing nickel hydroxide is coated with a hydroxide layer containing cobalt and cerium, and the resulting mixture can be heated at 120° C. for 1 hour in the air. The boiling point of the aqueous NaOH solution having a concentration of 48% by mass is 138° C. under atmospheric pressure. Thereafter, the solid matter is recovered, washed with water, and dried, and thereby, composite particles, in which the surface of the core layer particles containing nickel hydroxide is coated with a cobalt-cerium compound, can be obtained.

From the results of the structural analysis by X-ray diffraction described above, it is thought that the cobalt-cerium compound, which coats the surface, is made principally of a cobalt oxyhydroxide phase having a crystal structure of a space group R3m structure and a cerium dioxide phase having a crystal structure which is a fluorite structure and a space group Fm3m structure, and may include a slight amount of a tricobalt tetroxide crystal phase. Further, it is thought that a Na atom permeates into the cobalt oxyhydroxide phase when the hydroxide layer is oxidized in the coexistence of the aqueous NaOH solution.

By the above-mentioned method, positive active material particles of the present embodiment were prepared.

As a method for manufacturing a battery of the present embodiment by using the positive active material particles, a publicly known method can be employed except for using an electrolyte solution principally made of an aqueous sodium hydroxide solution. The method is roughly as follows.

An aqueous solution of a thickening agent (carboxymethylcellulose, etc.), and other additives as required are mixed in the active material particles, and the resulting mixture is formed into a paste. The formed paste is filled into a substrate having electron conductivity such as a porous nickel foam substrate, and dried, and then the substrate is pressed to a predetermined thickness to form a positive electrode plate.

An aqueous solution of a thickening agent (methylcellulose, etc.), a binder and other additives are added to a hydrogen storing alloy powder, and the resulting mixture is formed into a paste, applied onto both faces of a holed steel sheet, and dried, and then the steel sheet is pressed to a predetermined thickness to form a negative electrode plate.

The positive electrode plate and the negative electrode plate are wound in whorl with a separator subjected to a sulfonation treatment sandwiched therebetween to form an electrode group. The electrode group is housed in a cylindrical metal case, and an electrolyte solution principally made of an aqueous sodium hydroxide solution is poured into the case, and the case is sealed with a metal lid equipped with a safety valve, and thereby, a nickel-metal hydride rechargeable battery can be prepared.

EXAMPLES

Next, the effect of the alkaline secondary battery of the present invention will be described based on examples of nickel-metal hydride rechargeable batteries.

Example 1

An aqueous solution obtained by dissolving nickel sulfate, zinc sulfate and cobalt sulfate was added dropwise to a 1 mol/L aqueous ammonium sulfate solution which was controlled so as to keep a pH of 12 and a temperature of 45° C. while vigorously stirring. The pH was adjusted by using a 18% by mass aqueous NaOH solution. Then, the precipitate was collected by filtration, washed with water, and dried to obtain spherical nickel hydroxide particles. Zn was solid solution in an amount of 3% by mass and Co was solid solution in an amount of 0.6% by mass in nickel hydroxide.

The obtained nickel hydroxide particles were added to a 0.1 mol/L aqueous ammonium sulfate solution, and the resulting mixture was controlled so as to keep a pH of 9 and a temperature of 45° C. while vigorously stirring. The pH was adjusted by using a 18% by mass aqueous NaOH solution. To the aqueous solution, an aqueous solution, which was obtained by dissolving cobalt sulfate and cerium nitrate in such a way that the total of Co atoms and Ce atoms was 1.6 mol/L and the atomic ratio between Co and Ce was 8:2, was added dropwise to precipitate a hydroxide layer containing cobalt and cerium on the surface of the nickel hydroxide particles. Then, the hydroxide layer was filtrated, washed with water, and dried to obtain nickel hydroxide particles coated with a hydroxide containing cobalt and cerium. The amount of a precipitate on the surface of the nickel hydroxide particle was 7% by mass of the mass of the hydroxide particles.

40 g of a 48% by mass aqueous NaOH solution was added to 50 g of the obtained composite particles, and the resulting mixture was heated at 120° C. for 1 hour in the air to perform an oxidation treatment. The treated particles were collected by filtration, washed with water, and dried to obtain active material particles in which the surface of the core layer particles of nickel hydroxide is coated with a conductive auxiliary layer made of a cobalt-cerium compound.

Since the cobalt-cerium compound which coats the surface of the obtained active material particle was prepared by using the aqueous solution in which the "content rate of cerium" in Table 1 is 20 atomic % as a raw material, its composition can be estimated by interpolating data in Table 1. With respect to its approximate composition, it is thought that the cobalt-cerium compound contains about 70% by mass of a cobalt oxyhydroxide phase, about 26% by mass of a cerium dioxide phase, and about 4% by mass of a tricobalt tetroxide crystal phase.

The obtained active material particles, a 1% by mass aqueous solution of carboxylmethylcellulose as a thickening agent, and 2% by mass of ytterbium oxide were mixed and kneaded to prepare a paste, and the paste was filled into a nickel foam substrate having a substrate density of 380 g/m$^2$, and dried, and then the substrate was pressed to a thickness of 0.93 mm to form a positive electrode plate of 2000 mAh.

A hydrogen storing alloy powder having the composition of $La_{0.64}Pr_{0.20}Mg_{0.16}Ni_{3.50}Al_{0.15}$, which was pulverized to an average particle diameter D50 of 50 μm, was immersed in a 8 mol/L aqueous potassium hydroxide solution at 110° C. for 2 hours, and then washed with water repeatedly until the pH reached 10. To 100 parts by mass of the dried hydrogen storing alloy powder, an aqueous solution obtained by dissolving a thickening agent (methylcellulose) was added, and further 1 part by mass of a binder (styrene-butadiene rubber) was added, and the resulting mixture is formed into a paste, applied onto both faces of a holed steel sheet (aperture ratio 50%) of 35 μm in thickness, and dried, and then the steel sheet was pressed to a thickness of 0.33 mm to form a negative electrode plate of 2800 mAh.

The positive and negative electrodes were wound in whorl with a separator subjected to a sulfonation treatment sandwiched therebetween to form an electrode group, and the electrode group was housed in a cylindrical metal case. Next, 1.95 mL of a 7 mol/L aqueous NaOH solution as an electrolyte solution was poured into the case, and the case was sealed with a metal lid equipped with a safety valve to prepare a 2000 mAh nickel-metal hydride rechargeable battery having a size of AA.

Example 2

A nickel-metal hydride rechargeable battery was prepared by the same method as in Example 1 except that a 8 mol/L aqueous NaOH solution was used for an electrolyte solution.

Comparative Example 1

A nickel-metal hydride rechargeable battery was prepared by the same method as in Example 1 except that a 7 mol/L aqueous KOH solution was used for an electrolyte solution.

Comparative Example 2

A nickel-metal hydride rechargeable battery was prepared by the same method as in Example 1 except that an aqueous solution obtained by dissolving only cobalt sulfate was used in place of the aqueous solution obtained by dissolving cobalt sulfate and cerium nitrate, and active material particles not containing the cerium dioxide phase were prepared and used for the conductive auxiliary layer.

Comparative Example 3

A nickel-metal hydride rechargeable battery was prepared by the same method as in Example 1 except that active material particles not containing the cerium dioxide phase were prepared by the same method as in Comparative Example 2 and used for the conductive auxiliary layer and a 7 mol/L aqueous KOH solution was used for an electrolyte solution.

(Initial Formation)

The battery prepared as described above was subjected to initial formation according to the following procedure. Charging was performed at a current of 0.1 ItA (200 mA) at 20° C. for 12 hours, and then discharging was performed at a current of 0.2 ItA (400 mA) until the voltage reached 1 V, and this charge-discharge cycle was repeated two times. Thereafter, the battery was stored at 40° C. for 48 hours. Then, charging was performed at a current of 0.1 ItA (200 mA) at 20° C. for 16 hours, and the battery was paused for 1 hour, and then discharging was performed at a current of 0.2 ItA (400 mA) until the voltage reached 1 V, and this charge-discharge cycle was repeated three times to complete the formation.

(Measurement Method of Remaining Discharge Capacity and Remaining Capacity Retention Ratio)

Charging was performed at a current of 0.1 ItA (200 mA) at 20° C. for 16 hours, and the battery was paused for 1 hour, and then discharging was performed at a current of 0.2 ItA (400 mA) until the voltage reached 1 V to measure the discharge capacity before storing the battery. Then, the battery was charged at a current of 0.1 ItA (200 mA) for 16 hours, and then stored at 45° C. for 14 days. Thereafter, the environmental temperature was set at 20° C., and discharging was performed at a current of 0.2 ItA (400 mA) until the voltage reached 1 V to determine the remaining discharge capacity.

Remaining capacity retention ratio(%)=(remaining discharge capacity/discharge capacity before storing)×100

(Measurement Method of Recovered Discharge Capacity and Discharge Capacity Retention Ratio after Overdischarge)

Charging was performed at a current of 0.1 ItA (200 mA) at 20° C. for 16 hours, and the battery was paused for 1 hour, and then discharging was performed at a current of 0.2 ItA (400 mA) until the voltage reached 1 V to measure the discharge capacity before overdischarge. Then, a resistance of 3Ω was connected to the battery at 60° C. for 6 hours and overdischarge was performed. Thereafter, charging was performed at a current of 0.1 ItA (200 mA) at 20° C. for 16 hours, and the battery was paused for 1 hour, and then discharging was performed at a current of 0.2 ItA (400 mA) until the voltage reached 1 V to determine the recovered discharge capacity.

Discharge capacity recovery ratio(%)=(recovered discharge capacity/discharge capacity before overdischarge)×100

(Test Result)

A list of test results is shown in FIG. 1 together with examples and comparative examples described later.

In the table, "Co" in the box of the conductive auxiliary layer represents a sample in which the surface of the core layer of nickel hydroxide is coated with only cobalt oxyhydroxide, and "Co, Ce" represents a sample in which the surface of the core layer is coated with a cobalt-cerium compound, and the content rate of Ce in the aqueous Co—Ce solution is 20 atomic %. The discharge capacity recovery ratio and the remaining capacity retention ratio were respectively measured by the above-mentioned method.

The effect of cerium dioxide and NaOH on the remaining capacity retention ratio and the discharge capacity recovery ratio can be checked by comparing Examples 1 and 2 with Comparative Examples 1 to 3.

First, the remaining capacity retention ratio will be described.

Comparing Comparative Example 3 with Comparative Example 2, the remaining capacity retention ratio is increased by 2.5% from 84.8% to 87.3% by changing the electrolyte solution from KOH to NaOH. The reason for this is thought to be an increase in the oxygen generation overvoltage by use of NaOH (a potential at which oxygen is generated shifted to a noble side.).

Comparing Comparative Example 3 with Comparative Example 1, the remaining capacity retention ratio is increased by 1.9% from 84.8% to 86.7% by changing the conductive auxiliary layer from cobalt oxyhydroxide to the cobalt-cerium compound including a cobalt oxyhydroxide phase and a cerium dioxide phase. The reason for this is also thought to be an increase in the oxygen generation overvoltage.

In Example 1, the remaining capacity retention ratio was 90.5% which is markedly higher than those in Comparative Examples 2 and 3, and is higher than the remaining capacity retention ratio obtained by simply adding the above-mentioned effects of NaOH and the cerium dioxide phase to the result of Comparative Example 1. From this result, it can be considered that there was a synergistic effect of cerium dioxide and NaOH.

In Examples 1 and 2, NaOH concentrations are different, but both examples exhibited almost the same remaining capacity retention ratio.

Next, the discharge capacity recovery ratio will be described.

The discharge capacity recovery ratio of Example 1 was 99.9% and the initial capacity was almost recovered even after overdischarge. It is suggested from this result that the reduction of CoOOH hardly proceeds even in an overdischarge state.

The discharge capacity recovery ratio is not only higher than 96.5% of Comparative Example 3 but also higher than 97.3% of Comparative Example 1 (including cerium dioxide as with Example 1), and Example 1 exhibits a marked synergistic effect by cerium dioxide and NaOH.

As described above, the nickel-metal hydride battery having a wound electrode assembly has been described as an embodiment of the present invention, but the present invention is not limited to this. Since the present invention is characterized by the conductive auxiliary layer on the surface of a positive active material particles principally made of nickel hydroxide and the composition of an alkaline electrolyte solution, the present invention can also be embodied as a nickel-cadmium battery and other alkaline secondary batteries. Further, the present invention can be embodied as batteries having electrode assemblies of other various types such as a layered electrode assembly other than a wound electrode assembly.

DESCRIPTION OF REFERENCE SIGNS

101 working electrode
102 reference electrode
103 counter electrode
104 control device

The invention claimed is:

1. An alkaline secondary battery comprising a positive electrode having a substrate and active material particles principally made of nickel hydroxide, a negative electrode, and an electrolyte solution, wherein
the positive active material particle has a core layer containing nickel hydroxide and a conductive auxiliary layer which coats the surface of the core layer,
the conductive auxiliary layer contains a cobalt oxyhydroxide phase and a cerium dioxide phase,
the electrolyte solution is principally made of an aqueous sodium hydroxide solution,
the cobalt oxyhydroxide phase has a rhombohedral structure and an R3m structure, and a portion of cobalt of the cobalt oxyhydroxide phase is substituted by cerium, and
the cerium dioxide phase has a fluorite structure and an Fm3m structure, and a portion of cerium of the cerium dioxide phase is substituted by cobalt.

2. The alkaline secondary battery of claim 1, wherein
in the conductive auxiliary layer, the cobalt oxyhydroxide phase exists together with the cerium dioxide phase.

3. The alkaline secondary battery of claim 1, wherein
in the conductive auxiliary layer, the cobalt oxyhydroxide phase exists together with the cerium dioxide phase such that the cerium dioxide phase inhibits reduction of cobalt oxyhydroxide.

4. The alkaline secondary battery of claim 1, wherein
the cobalt oxyhydroxide phase comprises cerium at 3a1 site, 3a2 site, or combination thereof of the crystal structure, and
the cerium dioxide phase comprises cobalt at 4a site of the crystal structure.

5. The alkaline secondary battery of claim 1, wherein
the conductive auxiliary layer consists of:
    the cobalt oxyhydroxide phase,
    the cerium dioxide phase, and
    optionally a tricobalt tetroxide crystal phase.

6. The alkaline secondary battery of claim 1, wherein
the conductive auxiliary layer consists of:
    the cobalt oxyhydroxide phase,
    the cerium dioxide phase, and
    optionally a tricobalt tetroxide crystal phase;
the cobalt oxyhydroxide phase comprises cerium at 3a1 site, 3a2 site, or combination thereof of the crystal structure; and
the cerium dioxide phase comprises cobalt at 4a site of the crystal structure.

7. The alkaline secondary battery of claim 1, wherein
the conductive auxiliary layer comprises 6.5% by mass or more and 88.2% by mass or less of the cerium dioxide phase with respect to the total of the cobalt oxyhydroxide phase and the cerium dioxide phase.

8. The alkaline secondary battery of claim 1, wherein
the conductive auxiliary layer comprises 13.4% by mass or more and 48.6% by mass or less of the cerium dioxide phase with respect to the total of the cobalt oxyhydroxide phase and the cerium dioxide phase.

9. An alkaline secondary battery comprising a positive electrode having a substrate and active material particles principally made of nickel hydroxide, a negative electrode, and an electrolyte solution, wherein
the positive active material particle has a core layer containing nickel hydroxide and a conductive auxiliary layer which coats the surface of the core layer,
the conductive auxiliary layer consists of a cobalt oxyhydroxide phase, a cerium dioxide phase, and optionally a tricobalt tetroxide crystal phase, the cobalt oxyhydroxide phase existing together with the cerium dioxide phase in the conductive auxiliary layer such that the cerium dioxide phase inhibits reduction of cobalt oxyhydroxide, the electrolyte solution comprises an aqueous sodium hydroxide solution, the cobalt oxyhydroxide phase has a rhombohedral structure and an R3m structure, a portion of cobalt of the cobalt oxyhydroxide phase is substituted by cerium, and the cobalt oxyhydroxide phase comprises cerium at 3a1 site, 3a2 site, or combination thereof of the crystal structure, the cerium dioxide phase has a fluorite structure and an Fm3m structure, a portion of cerium of the cerium dioxide phase is substituted by cobalt, and the cerium dioxide phase comprises cobalt at 4a site of the crystal structure, and the conductive auxiliary layer comprises 6.5% by mass or more and 88.2% by mass or less of the cerium dioxide phase with respect to the total of the cobalt oxyhydroxide phase and the cerium dioxide phase.

10. A positive electrode of an alkaline secondary battery comprising:

a nickel foam substrate; and active material composite particles, wherein the active material composite particle comprises a core particle comprising nickel hydroxide and a conductive auxiliary layer which coats a surface of the core;

the conductive auxiliary layer of the composite particle comprises a cobalt oxyhydroxide phase and a cerium dioxide phase;

the cobalt oxyhydroxide phase has a rhombohedral structure and an R3m structure, and a portion of cobalt of the cobalt oxyhydroxide phase is substituted by cerium; and the cerium dioxide phase has a fluorite structure and an Fm3m structure, and a portion of cerium of the cerium dioxide phase is substituted by cobalt.

* * * * *